United States Patent [19]

Cummings et al.

[11] Patent Number: 4,763,230

[45] Date of Patent: Aug. 9, 1988

[54] WHEEL LIGHTS

[76] Inventors: Donald G. Cummings, 3130 Meadowlane West, Dickinson, Tex. 77539; Kenneth G. Rose, 2501 20th St. North, Texas City, Tex. 77590

[21] Appl. No.: 59,322

[22] Filed: Jun. 8, 1987

[51] Int. Cl.⁴ .............................................. B62J 5/00
[52] U.S. Cl. ...................................... 362/78; 362/72; 340/134
[58] Field of Search ................... 362/72, 78, 234, 249, 362/252, 296, 806; 340/134; 310/67 A

[56] References Cited

U.S. PATENT DOCUMENTS

| | | | |
|---|---|---|---|
| 2,811,633 | 10/1957 | Bjork | 362/72 |
| 3,987,409 | 10/1976 | Freeman | 340/134 |
| 4,135,229 | 1/1979 | Modurkay | 362/72 |
| 4,176,390 | 11/1979 | Galbert | 362/72 |
| 4,225,848 | 9/1980 | Roberts | 362/72 X |
| 4,264,845 | 4/1981 | Bednarz | 362/800 X |
| 4,562,516 | 12/1985 | Chastain | 362/78 |

FOREIGN PATENT DOCUMENTS

| | | | |
|---|---|---|---|
| 52-25597 | 2/1977 | Japan | 340/134 |
| 2168660 | 6/1986 | United Kingdom | 340/134 |

Primary Examiner—Tony M. Argenbright
Assistant Examiner—Eric R. Carlberg
Attorney, Agent, or Firm—Robert W. B. Dickerson

[57] ABSTRACT

A plurality of light members, forming a string, connected across a source of electrical power; a source of power being adapted to be secured to a vehicle wheel, the string being adapted to be interleafed between the spokes of the wheel, the lights being adapted to be secured to individual ones of said spokes.

2 Claims, 1 Drawing Sheet

U.S. Patent    Aug. 9, 1988    4,763,230
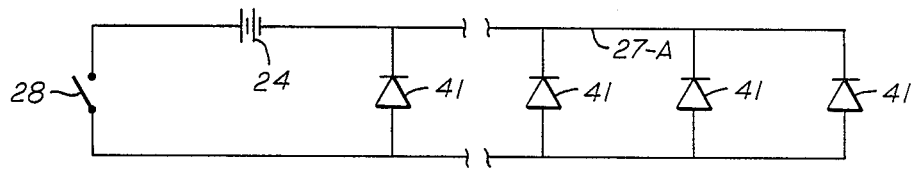
FIG. 1
FIG. 2
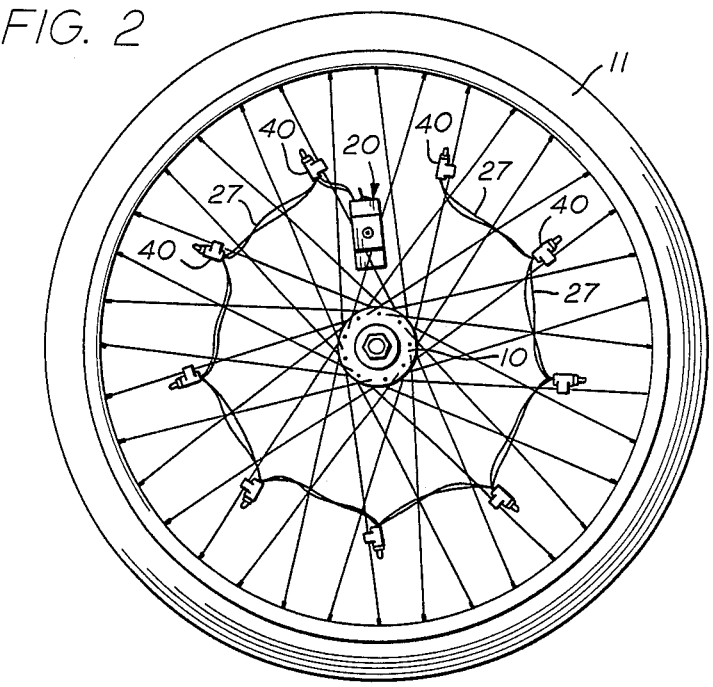
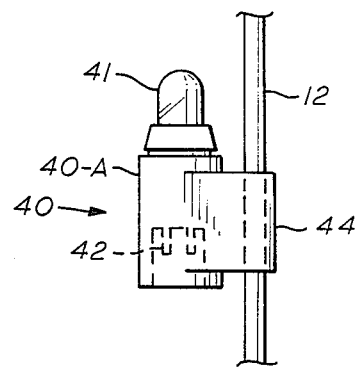
FIG. 3-A
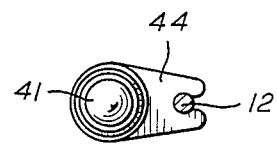
FIG 3-B
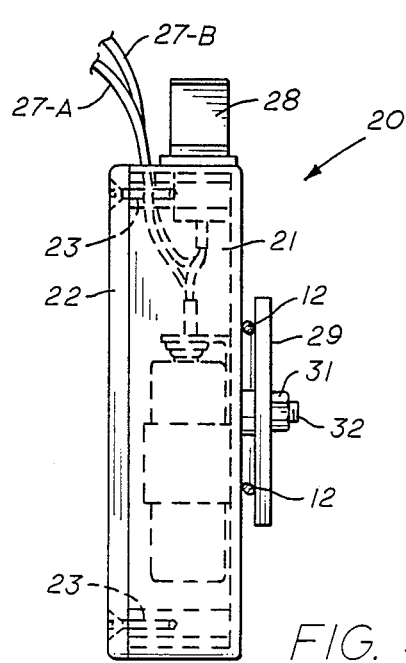
FIG. 4-A
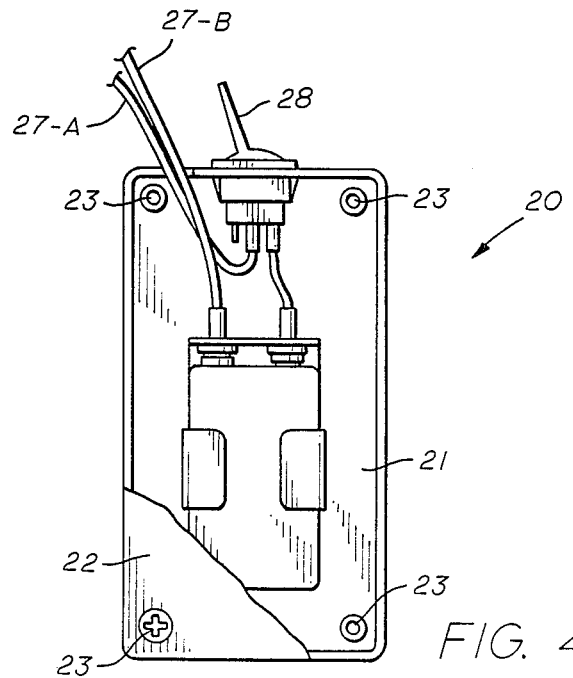
FIG. 4-B

WHEEL LIGHTS

BACKGROUND OF THE INVENTION

The dual original goals of this invention were to improve on the safety of a bicycle being driven at night, and to provide a more attractive and unique appearance for such a bike. During development, it has become apparent that the wheel lights discussed hereinafter would have utility on wheels in addition to those used on bicycles. It has been suggested heretofore that displays may be secured to bicycle wheels, especially to enhance the rider's visibility. Such displays have included colorful banners, ribbons and, in some cases, lights. A search disclosed the following U.S. patents, namely U.S. Pat. Nos. 3,113,727; 3,501,628; 3,737,647; 4,135,229; 4,176,390; 4,264,845; 4,381,537; 4,430,692; and 4,562,516. At least one product advertised depicted a single light, powered by a battery, adapted to be secured to bicycle wheel spokes. Applicant's desire was to be able to use a plurality of connected lights, powered by a portable source, all being removably attachable to wheel spokes, wherein a la some Christmas Tree Strings, interruption of one light would not pe se interrupt all lights.

SUMMARY OF THE INVENTION

A battery pack, containing a small battery as a source of power, has its terminals connected by a pair of conducting coils. Connected in parallel between said conducting coils are a plurality of light sources, such as those of the LED variety. A manually controlled switch may be inserted in the circuit to render it inoperable during daylight hours. The battery pack and the individual lights may be removably secured to the spokes of a wheel.

DESCRIPTION OF THE DRAWINGS

FIG. 1 is a schematic of the circuitry comprising this invention;

FIG. 2 is a side elevation of the invention secured to spokes of a bicycle;

FIGS. 3-A and 3-B are, respectively, side and top elevations of the combination lampholder and clip; and FIGS. 4-A and 4-B are, respectively, a side elevation with cover in place, and rear elevation with cover broken away, of the battery pack. cl DESCRIPTION OF A PREFERRED EMBODIMENT The overall appearance of the invention is best illustrated by FIG. 2. An exemplary bicycle wheel includes a central hub 10 connected to tire-carrying rim 11 by a series of spokes 12. Removably secured (in a manner hereinafter described) to separate ones of said spokes is battery pack 20 as well as a plurality of combination lamp holders and clips, the combination being generally designated by the numeral 40.

The battery pack 20 includes cup-shaped body portion 21 and cover 22, removable by virtue of fasteners 23. Snugly positioned within housing 21, is a compact, low-voltage, battery 24, see FIG. 1. The battery's terminals are each conductively connected to one of wire conductors 27-A, 27-B. In FIG. 2, said conductors are collectively illustrated at 27. Shunted between said conductors, in parallel, is a plurality of members 40. Inserted within the circuit comprising battery 24 and conductors 27-A, 27-B, such as by interrupting conductor 27-A (see FIG. 1), is manually controlled, toggle switch 28. Such a switch, acting in a known manner, opens or closes the circuit as a function of the toggle position. Opposite cover 22, is clamp 29, comprising a removable plate. The clamp removably secures the battery body 21 to spokes 12, by virtue of nut 31 threadedly engaging threaded shaft 32, the latter member having its head secured within housing body 21. FIG. 1 schematically illustrates each holder-clip 40 to be in parallel with the others. Thus on a malfunction occurring to one, performance of the others should continue.

Each combination member 40, generally fabricated of a somewhat resilient plastic material, includes lamp receiving portion 40-A and clip portion 44. The lamps 41 contemplated are the LED (light emitting diode) type. At the base of the hollow lamp receiving portion 40-A are standard terminals 42 to receive, in electrical communication therewith, each of conductors 27-A, 27-B. Clip portion 44 may have opposed lips slightly spread apart to receive a spoke 12.

Prior to operation, a light string would have been formed by a number of combination members 40 having being secured, in spaced relationship to each other, to conductors 27-A, 27-B. Such conductors would each be in electrical communication with terminals 42. Lamps 41 would also be in such communication with such terminals. With switch 28 in the "off" position, battery pack 20 would be secured, by clamp 29, to a pair of adjacent spokes 12. As the string is unrolled, so to speak, and interleafed between and around spokes 12, adjacent holder-clips 40 will be secured to spokes 12. Substantially as many lamps 41 can be included as desired—certainly enough so as to extend circumferentially around the wheel. When actuation is desired, toggle switch 28 may be moved to the "on" position, closing the circuit, energizing all of the LED lamps 41. As the wheel turns, the multi-light display will form a series of concentric rings, forming a unique presentation, and directing the attention of nearby motorists to the presence of the rider.

Although only a single embodiment has been described, it should be obvious that numerous modifications would be possible by one skilled in the art without departing from the spirit of the invention, the scope of which is limited only by the following claims.

What is claimed is:

1. A string of lights adapted to be intertwined among the spokes of a wheel, said string comprising:
   a source of eletric power, comprising a two-terminal battery secured to said spokes of said wheel;
   an electrical circuit comprising:
      a pair of flexible conductive leads adapted to be intertwined among the spokes of said wheel, each said lead providing means for linking one of said battery terminals with one terminal of a plurality of parallel connected lamps, said circuit further comprising means for selectively opening and closing said circuit.

2. The string of claim 1 wherein each of said lamps is removably positionable within a holder, said battery and said opening and closing means are provided with a common housing, and each said holder and said housing includes means for snap fitting it to one of said spokes.

* * * * *